US012018480B2

(12) United States Patent
Sessler

(10) Patent No.: US 12,018,480 B2
(45) Date of Patent: Jun. 25, 2024

(54) SOUND DAMPING STRUCTURAL SUPPORT SYSTEM

(71) Applicant: Jon Sessler, Sumner, WA (US)

(72) Inventor: Jon Sessler, Sumner, WA (US)

(73) Assignee: Jon Sessler, Sumner, WA (US)

( * ) Notice: Subject to any disclaimer, the term of this patent is extended or adjusted under 35 U.S.C. 154(b) by 350 days.

(21) Appl. No.: 17/411,817

(22) Filed: Aug. 25, 2021

(65) Prior Publication Data

US 2022/0074198 A1 Mar. 10, 2022

Related U.S. Application Data

(60) Provisional application No. 63/076,238, filed on Sep. 9, 2020.

(51) Int. Cl.

| | |
|---|---|
| ***E04B 2/60*** | (2006.01) |
| ***E04B 1/82*** | (2006.01) |
| ***E04B 1/84*** | (2006.01) |
| ***E04B 2/74*** | (2006.01) |
| ***E04C 3/32*** | (2006.01) |
| ***G10K 11/162*** | (2006.01) |

(52) U.S. Cl.

CPC .................. *E04B 2/60* (2013.01); *E04B 1/84* (2013.01); *E04B 2/7412* (2013.01); *E04B 2/7414* (2013.01); *E04C 3/32* (2013.01); *G10K 11/162* (2013.01); *E04B 2001/8263* (2013.01)

(58) Field of Classification Search

CPC ........ E04B 2/60; E04B 2/7412; E04B 2/7414; E04B 2001/8263; E04B 1/84

See application file for complete search history.

(56) References Cited

U.S. PATENT DOCUMENTS

| | | | |
|---|---|---|---|
| 1,951,346 | A | 3/1934 | Collins |
| 2,363,164 | A | 11/1944 | Waller |

(Continued)

FOREIGN PATENT DOCUMENTS

| | | | |
|---|---|---|---|
| CN | 108678233 A | 10/2018 | |
| DE | 20 2012 012 342 U1 | 3/2013 | |

(Continued)

OTHER PUBLICATIONS

"A Practical Guide to Office Acoustics," Version 1.0, Robert Derector Associates / SIA Acoustics, Jul. 24, 2020, 56 pages.

(Continued)

*Primary Examiner* — Jeremy A Luks

(74) *Attorney, Agent, or Firm* — Seed IP Law Group LLP

(57) ABSTRACT

An acoustic damping structural system includes studs, tracks, and acoustic damping members. The studs and tracks include a first wall, a second wall, and a third wall that define a channel. The third wall includes a first portion perpendicular to the first wall, a second portion perpendicular to the first portion, and a third portion perpendicular to the second portion to define a ledge along a length of the third wall. The tracks are coupled to a support, such as floor joists and roof beams, in parallel. Opposite ends of the studs are received in the channels of the tracks, with the acoustic damping members received on and coupled to the ledges of pairs of the studs and pairs of the tracks. The acoustic damping members are planar with the ledges and the studs and tracks, respectively.

19 Claims, 7 Drawing Sheets

(56) References Cited

U.S. PATENT DOCUMENTS

| | | | |
|---|---|---|---|
| 2,958,982 A | 11/1960 | Baker | |
| 3,270,472 A | 9/1966 | Gilbert | |
| 3,925,948 A | 12/1975 | Sauer et al. | |
| 4,835,935 A | 6/1989 | Murphy | |
| 5,606,840 A | 3/1997 | Hase | |
| 5,647,186 A | 7/1997 | Donaldson | |
| 5,907,932 A | 6/1999 | LeConte et al. | |
| 7,223,043 B1 | 5/2007 | Andrews | |
| 7,594,331 B2 | 9/2009 | Andrews et al. | |
| 8,061,099 B2 | 11/2011 | Andrews | |
| 8,074,416 B2 | 12/2011 | Andrews | |
| 8,307,610 B2 | 11/2012 | Landers | |
| 9,523,197 B2 | 12/2016 | Sessler et al. | |
| 9,771,715 B2 | 9/2017 | Sessler et al. | |
| 10,465,382 B2 * | 11/2019 | Rice | E04B 2/7457 |
| 2005/0241258 A1 | 11/2005 | Shih | |
| 2006/0032183 A1 | 2/2006 | Peterson | |
| 2010/0218451 A1 | 9/2010 | Andrews | |
| 2012/0000149 A1 | 1/2012 | Rice | |
| 2012/0066993 A1 | 3/2012 | Mommer et al. | |
| 2015/0361659 A1 | 12/2015 | Sessler et al. | |
| 2017/0044760 A1 | 2/2017 | Sessler et al. | |
| 2021/0372121 A1 * | 12/2021 | Sobel | E04B 2/60 |

FOREIGN PATENT DOCUMENTS

| | | | |
|---|---|---|---|
| EP | 2 691 585 A | 2/2014 | |
| EP | 2691585 B1 * | 1/2019 | E04B 1/88 |

OTHER PUBLICATIONS

"TRAKLOC® Stud Products: Trakloc® Elevator Stud™ (TLE)," ClarkDietrich, Apr. 25, 2018, 1 page.

* cited by examiner

SOUND DAMPING STRUCTURAL SUPPORT SYSTEM

BACKGROUND

Technical Field

The present disclosure is directed to a structural support system that provides damping of sound and vibration, and more specifically, to a double stud wall with acoustic damping members.

Description of the Related Art

It is desirable in many environments to reduce transmission of sound and vibration through walls of adjacent rooms, such as in high occupancy buildings like apartment and office buildings. To this end, products and methods have been developed to reduce the transmission of sound and vibration in buildings.

One measure of the sound damping characteristics of a wall is called the sound transmission coefficient (STC). The STC of a particular wall provides an indication of the attenuation that the wall provides for acoustic waves and, thus, an indication of the sound damping that the wall provides between adjacent rooms. Standard sheets of drywall, such as low gypsum board, may have an STC of approximately 26. Thicker drywall may have STCs in the range of 28 and 29. Two drywall panels placed abutting each other, if each is a standard gypsum board, will have an STC of 34. Generally, an STC in the range of 35 or lower indicates that a significant amount of sound will pass from one room to another and the wall provides little attenuation for acoustic waves.

In order to obtain attenuation to reach an STC in the range of 55-60, which is often desired, it is currently the practice to create two walls, each of which has a set of studs to support the drywall on both sides of the wall, and then place one or more layers of sound-attenuation material, such as an acoustic damping insulation or other material, between them. While such a structure is sufficient to obtain an STC in the range of 55 or higher, it is expensive, time-consuming to construct, and also takes some skill to properly assemble.

Other past attempts to increase the STC of wall assemblies have focused on specialty products which, in many instances, are prohibitively expensive. Further techniques have been to add significant layers of conventional materials that increase the mass, which, while increasing the STC rating, adds significant cost as well as additional labor cost to install. The assembly of walls has also been split into multiple phases in order to add layers of conventional construction material at additional surfaces to achieve a higher STC rating. However, the additional assembly steps or phases increase cost and the time to complete construction, which negatively impacts the construction schedule. Another downside of using multiple layers of materials, or multiple phases, is the reduction in floor area in the finished building as a result of the additional layers of material extending further into a room than single layers of material. Yet a further downside of some methods and products is that material can extend beyond the outer surface of the studs, which can impact drywall installation or create cracking of the drywall with time.

BRIEF SUMMARY

The present disclosure is directed to a sound damping structural support system. The system includes tracks that are configured to be coupled to supports, such as floor joists, concrete, roof beams, or other similar supports. The tracks are coupled to supports in pairs that are arranged parallel and spaced from each other and aligned vertically to define upper and lower boundaries of a wall. In other words, the tracks include a first pair of tracks that are coupled to concrete at the bottom of a wall and arranged parallel to, but spaced apart from each other. A second pair of tracks are coupled to roof beams at the top of a wall in a similar parallel spaced relationship. The second pair of tracks are aligned with the first pair of tracks to allow for installation of a vertical wall. Each track further includes a channel extending along a length of the track.

The system further includes studs with opposite ends that are received in the channels of the tracks. The studs are aligned in pairs in a dual stud construction. Each of the studs and the tracks include a first wall, a second wall coupled to the first wall, and a third wall coupled to the first wall and spaced from the second wall across a width of the first wall to define the channel. The third wall includes a first portion, a second portion, and a third portion where the first portion is perpendicular to the first wall, the second portion is perpendicular to the first portion, and the third portion is perpendicular to the second portion and parallel to the first portion to define an "L" shaped ledge that extends along a length of the third wall. When the tracks are coupled to the supports, the tracks are arranged with the ledges facing each other. Similarly, the studs are coupled to the tracks with the ledges facing each other.

Acoustic damping members are received on the ledge of adjacent pairs of tracks and on the ledge of adjacent pairs of studs. The acoustic damping members have a rectangular shape with a first outermost surface that is planar with the ledge and a second outermost surface that is planar with an outer surface of the first wall, such that the acoustic damping members are flush with the first wall of each of the studs and each of the tracks. This arrangement allows for installation of drywall over the studs in a flat and planar manner while also increasing the attenuation of sound waves through the wall, which increases the sound transmission coefficient of the finished. Further, the use of acoustic damping members during wall assembly is more efficient in terms of labor and material costs compared to known methods and products.

BRIEF DESCRIPTION OF THE SEVERAL VIEWS OF THE DRAWINGS

For a better understanding of the embodiments, reference will now be made by way of example only to the accompanying drawings. In the drawings, identical reference numbers identify similar elements or acts. In some figures, the structures are drawn to scale. In other figures, the sizes and relative positions of elements in the drawings are not necessarily drawn to scale. For example, the sizes, shapes of various elements and angles may be enlarged and positioned in the figures to improve drawing legibility.

DETAILED DESCRIPTION

Figure 1:
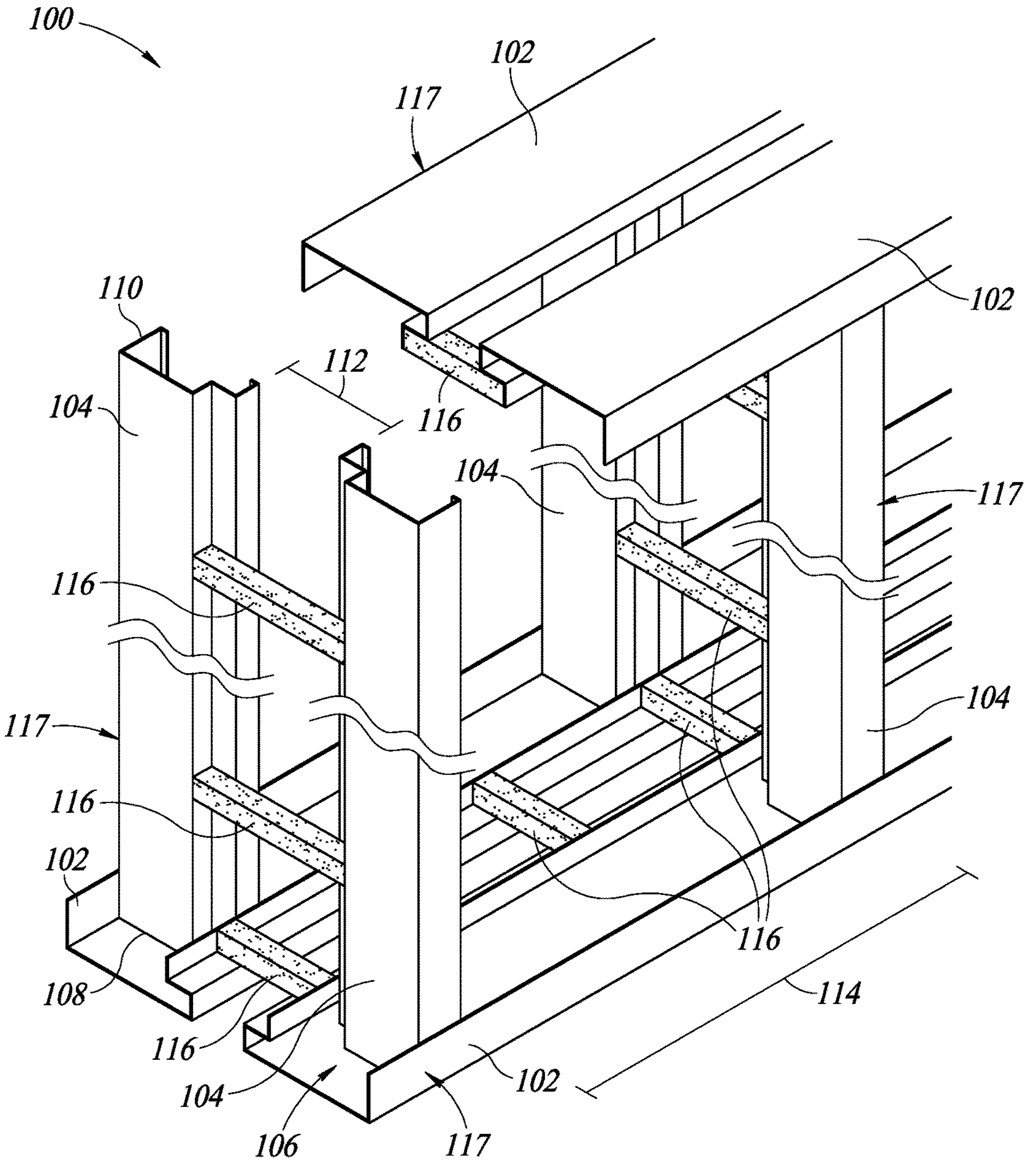
FIG. 1 is an isometric view of a structural support system according to the present disclosure.

The present disclosure is generally directed to structural support systems that attenuate acoustic waves. FIG. 1 is an isometric view of such a structural support system 100. The system 100 includes a plurality of tracks 102 that are configured to be coupled to a support, such as the floor, ceiling, concrete, floor joists, or roof beams, among other like structures. The system further includes a plurality of studs 104 coupled to corresponding ones of the tracks 102. More specifically, each of the tracks 102 includes a channel 106 extending along a length of the track. Each stud 104 includes a first end 108 and a second end 110, which may be a bottom end and a top end, respectively. The first end 108 of each stud 104 is received in the channel 106 of a bottom one of the tracks 102 and the second end 110 of each stud 104 is received in the channel 106 of a top of the tracks 102. The top and bottom tracks 102 are aligned, such that the stud 104 is arranged vertically to support drywall or other finishing materials.

As shown in FIG. 1, the tracks 102 are arranged in parallel pairs on the bottom and top of the system 100. In some embodiments, the tracks 102 are manufactured in standard lengths, such as 8 feet, 10 feet, 12 feet, or more or less. Where the total length of the track 102 is greater than the standard length, multiple tracks can be aligned with each other and installed abutting each other at the ends to extend the length of the track 102. As such, the total length of the track 102 can be selected according to design factors. In some embodiments, the track 102 is cut to length at the assembly plant or on the job sit for a specific application. Further, the studs 104 are aligned in pairs and received in the tracks 102. The studs 104 in each pair of aligned studs 104 are spaced apart by a distance 112 that can be selected according to design factors. In some embodiments, the distance 112 is decreased to reduce an overall width of the system 100, which increases the usable space of the rooms in a building. However, in one or more embodiments, the distance 112 is increased to provide further separation between studs 104 to further isolate the studs 104 and attenuate acoustic waves.

The distance 112 may be less than 1 inch, 2 inches, 3 inches, 4 inches, 5 inches, 6 inches, or more or less, in some embodiments. Further, each pair of studs 104 is spaced from other pairs of studs 104 along the tracks 102 by a distance 114 that is similarly selected according to design factors and load bearing capacity. In some non-limiting examples, the distance 114 is 16 inches or 24 inches on-center, or at any other standard stud spacing used in the industry or a custom selected stud spacing. Further, although FIG. 1 illustrates only two pairs of studs 104 for ease of recognition in the drawings, it is to be appreciated that a wall containing the system 100 may include 5, 10, 15, 20 or more or less pairs of studs, depending on the length of the wall. A plurality of acoustic damping members 116 are coupled between the pairs of tracks 102 and the pairs of studs 104 to further attenuate acoustic waves, as further described herein.

In some embodiments, the tracks 102, studs 104, and acoustic damping members 116 are assembled in a mass-production factory and sent to a job site for installation. For example, according to one embodiment, the aligned pairs of tracks 102 and the acoustic members 116 coupled to the tracks 102 are assembled at the factory and shipped to the job site for installation as a single, integral, unitary track assembly. The unitary assemblies of the tracks 102, studs 104 and acoustic members 116 can be assembled with the tracks 102 at some selected length, such as 6', 8', 12', 16', etc. Once on site, they can be used at their original length if the building construction plans permit or they can have their length trimmed while at the construction site to exactly fit the correct length.

The studs 104 and the acoustic members 116 coupled to the studs are assembled at the factory as a single, integral, unitary stud assembly. At the job site, the operator installs the track assemblies and the stud assemblies in single steps to form a single, unitary, integral wall assembly, instead of having to construct each track 102 and stud 104 one at a time, which reduces cost and labor hours. Moreover, the acoustic members 116 dampen or attenuate acoustic and vibration waves, as described herein, and eliminate the need for additional insulation between the tracks 102 and studs 104 in some embodiments, which further reduces costs and saves time. However, the component parts of system 100 can also be manufactured and assembled on site in individual units, including with the installation of additional insulation, in some embodiments.

In use, the installer aligns the tracks 102 with the selected location of a wall. The tracks 102 can be secured to supports by any acceptable method, including fasteners such as sheet metal screws, bolts, and other like structures. Then, the studs 104 are inserted into the channels 106 of the tracks 102 and secured to the tracks 102 by any acceptable method, such as with sheet metal screws. The operator can then install sheet rock or drywall over the assembled system 100 by securing the sheet rock to flat and planar surfaces 117 of the track 102 and the studs 104. In some embodiments, the tracks 102 may have pre-fabricated holes at a set spacing along the tracks 102 for receiving sheet metal screws to couple the studs 104 to the tracks 102. Alternatively, the tracks 102 may not have pre-fabricated holes and the operator couples the studs 104 to the tracks 102 by installing sheet metal screws directly through the tracks 102 and into the studs 104 at selected locations.

In another, alternative embodiment, studs 104, and acoustic damping members 116 are assembled in a mass-production factory and sent to a job site for installation and the tracks 102 are sent separately. While at the job site, the aligned pairs of tracks 102 and the acoustic members 116 coupled to the tracks 102 are assembled together. This permits only the tracks 102 to have their length trimmed while at the construction site to exactly fit the correct length and then the studs 104 and the acoustic members 116 coupled to the studs 104 that were assembled at the factory as a single, integral, unitary stud assembly are connected for the first time to the tracks 102 while at the job site. In this embodiment, the proper number of studs 104 having the acoustic members 116 previously coupled to them are connected at the desired spacing to create the wall on the construction site itself.

Figure 2:
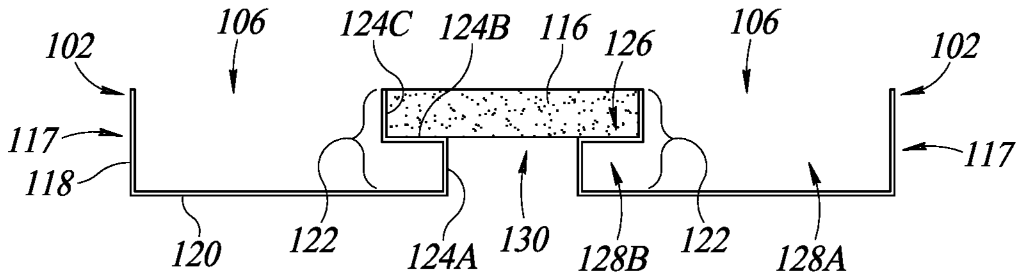
FIG. 2 is a front elevational view of a track assembly of the system of FIG. 1.

FIG. 2 is a front elevational view of the bottom tracks 102 in FIG. 1. The upper tracks 102 in FIG. 1 may have the same features as the bottom tracks 102 shown in FIG. 2, except the upper tracks 102 are installed in an inverse orientation. Each of the tracks 102 includes the channel 106 extending along a length of the track 102. The channel 106 is defined by walls of the track 102. More specifically, each track 102 includes a first wall 118 coupled to a second wall 120 and being perpendicular to the second wall 120. A third wall 122 is coupled to the second wall 120 and is perpendicular to the second wall 120. The third wall 122 is spaced from the first wall 118 across the second wall 120. In some embodiments, the second wall 120 may be referred to as a web 120 and the first and third walls 118, 122 may be referred to as flanges 118, 122 or sidewalls 118, 122. Each of the walls 118, 120, 122 may also be referred to as portions of the track 102, in one or more embodiments. The third wall 122 includes a first portion 124A coupled to the second wall 120 and being perpendicular to the second wall 120 as well as a second portion 124B coupled to the first portion and being perpendicular to the first portion 124A of the third wall 122. The second portion 124B of the third wall 122 extends into the channel 106 towards the first wall 118, in some embodiments.

A third portion 124C of the third wall 122 is coupled to the second portion 124B and is perpendicular to the second portion 124B. As such, the third wall 122 has a step down configuration with the portions 124A, 124B, 124C defining an insert or ledge 126 that extends along the length of each track 102, in some embodiments. In some embodiments, the first wall 118 is vertical and the second wall 120 is horizontal. The first portion 124A of the third wall 122 is vertical and parallel to the first wall 118. The second portion 1246 of the third wall 122 is horizontal and parallel to the second wall 120 and the third portion 124C of the third wall 122 is vertical and parallel to the first wall 118 and the first portion 124A of the third wall 122. However, the first portion 124A and the third portion 124C of the third wall 122 are offset from each other by a distance corresponding to the second portion 124B, or put differently, the first portion 124A is spaced from the third portion 124C across the second portion 124B. In one or more embodiments, each of the first, second and third portions 124A, 124B, 124C have the same size and length. However, in some embodiments, the first, second and third portions 124A, 124B, 124C have different sizes or lengths. Further, the first wall 118 and any portion 124A, 124B, 124C of the third wall 122 may be at any selected angle to the second wall 120, such as any angle between 0 and 90 degrees or between 90 degrees and 180 degrees in one or more embodiments.

Further, the walls 118, 120, 122 define the channel 106, such that the channel 106 has a first width from the first wall 118 to the first portion 124A of the third wall 122 that is greater than a width of the channel 106 from the first wall 118 to the third portion 124C of the third wall 122, in some embodiments. Put a different way, the channel has a major portion 128A defined by the first wall 118, a portion of the second wall 120 and the third portion 124C of the third wall 124C with a volume that is greater than a minor portion 128B defined by the first and second portions 124A, 124B of the third wall 122 and the remaining portion of the second wall 120. In one or more embodiments, the track 102 has an opposite arrangement, namely the second portion 1246 of the third wall extends away from the first wall 118, as described herein, such that the width between the first wall 118 and the third portion 124C of the third wall 122 is greater than the width between the first wall 118 and the first portion 124A of the third wall 122, as shown in more detail in FIG. 6D. In some embodiments, a width of the second portion 124B of the third wall 122 may be 2 inches, or more or less. The width of the track 102 between the first wall 118 and the third wall 124C is selected in order to receive one of the studs 104. As such, the width may be 1 inch, 2 inches, 3 inches, 4 inches, 5 inches, 6 inches, or more or less or any value there between, depending on the size of the studs 104.

The acoustic damping member 116 is received on the ledge 126 of each track 102 and is coupled to the track 102 by adhesives, fasteners, or any other acceptable method. In some embodiments, the acoustic damping member 116 is a rectangular block that is planar with a top of the track 102. More specifically, the acoustic damping member 116 is planar and flush with a top or uppermost edge of the third portion 124C of the third wall 122. The acoustic damping member 116 spans the distance between the tracks 102, but does not extend between the first portions 124A of the third walls 122 of the tracks 102. In other words, there is a gap or space 130 between the first portions 124A of the third walls 122 of the pairs of tracks 102, as shown in FIG. 2. The acoustic damping member 116 extends from ledge 126 of one track 102 to the ledge 126 of the other track 102, but does not extend into the gap 130 between the first portions 124A of the third walls 122, in some embodiments. As such, the acoustic damping member 116 is similarly planar or flush with the second portion 124B of the third wall 122 of each track 102.

Figure 3:
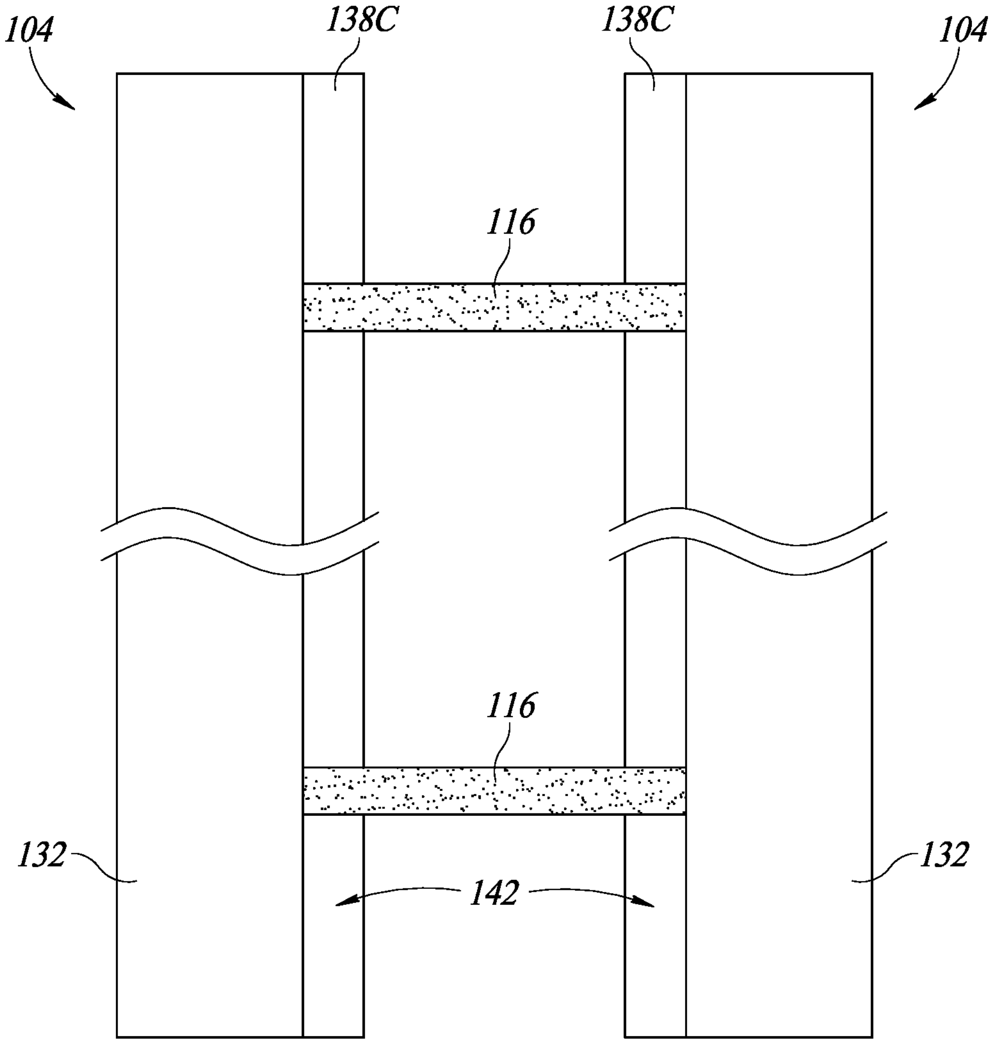
FIG. 3 is a front elevational view of a stud assembly of the system of FIG. 1.
Figure 4:
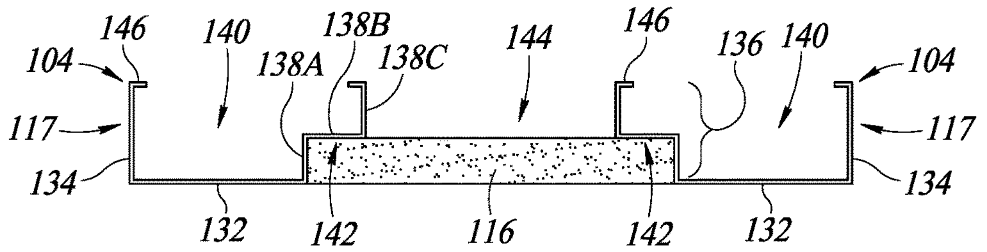
FIG. 4 is a top plan view of the stud assembly of FIG. 3.

FIG. 3 is an elevational front view of a pair of studs 104 isolated from the system 100 to show the studs 104 in more detail. Each of the studs 104 includes break lines in FIG. 3 to indicate that the studs 104 can be selected to be any length with similar features and structure along the selected length as described herein. FIG. 4 is a top plan view of the studs 104 shown in FIG. 3 to provide more detail of the profile of the studs 104. With reference to FIG. 3 and FIG. 4, each stud 104 includes a first wall 132 and a second wall 134 coupled to the first wall 132 and being perpendicular to, and extending vertically from, the first wall 132, in some embodiments. A third wall 136 is coupled to the first wall 132 with at least a portion of the third wall 136 perpendicular to, and extending vertically from, the first wall 132. The first wall 132 may also be referred to herein as a web 132 or a portion 132 of the stud 104. The second and third walls 134, 136 may also be referred to herein as sidewalls 134, 136, flanges 134, 136, or portions 134, 136 of the stud 104. In some embodiments, the second and third walls 134, 136 are at any angle to the first wall 132 and are not necessarily perpendicular to the first wall 132 as shown in FIG. 4. In some non-limiting examples, the second and third walls 134, 136 are at any angle between 0 and 90 degrees or between 90 degrees and 180 degrees, or more or less relative to the first wall 132.

The third wall 136 includes a first portion 138A coupled to a second portion 138B and a third portion 138C coupled to the second portion 138B. The first portion 138A of the third wall 136 is perpendicular to the first wall 132 and extends vertically from the first wall 132, in some embodiments. As such, the first portion 138A of the third wall 136 is parallel to the second wall 134. The second portion 138B is perpendicular to the first portion 138A and extends horizontally from the first portion 138A of the third wall 136. The second portion 1386 is therefore parallel to the first wall 132, in some embodiments. The third portion 138C is perpendicular to the second portion 138B of the third wall 136 and extends vertically from the second portion 1386, in parallel with the first portion 138A and the second wall 134. However, the third portion 138C of the third wall 136 is offset from the first portion 138A by the second portion 138B, meaning that the third portion 138C is spaced from the first portion 138A across the second portion 1386. The first, second, and third walls 132, 134, 136 of the stud 104 define a channel 140 extending along a length of the stud 104 in some embodiments.

Further, the first, second, and third portions 138A, 1386, 138C of the third wall 136 define a ledge or insert 142 extending along a length of the stud 104, similar to the ledge 126 described with reference to the tracks 102 in FIG. 2. However, unlike the track 102, the second portion 1386 of the third wall 136 extends away from the second wall 134 and away from channel 140. As such, the stud 104 has a length from the second wall 134 to the third portion 138C of the third wall 136 that is greater than a length from the second wall 134 to the first portion 138A of the third wall 136. The acoustic damping member 116 is received on the ledge 142 of each stud 104 and coupled to the studs 104 by any acceptable method. As shown in FIG. 3, each pair of studs 104 may include two acoustic damping members 116 coupled to the studs 104 and received on the ledge 142, with the damping members 116 spaced apart from each other by a selected distance. In some embodiments, a first one of the damping members 116 is positioned between a center and a top of the stud 104 and a second one of the damping members 116 is positioned between a center and a bottom of the stud 104. In yet further embodiments, the damping members 116 are positioned equidistant from each other and equidistant from a center of the stud 104. However, in one or more embodiments, the acoustic damping members 116 have a different number or arrangement and may not be spaced equidistant from each other or from the center of the stud 104, as described herein.

In some embodiments, the acoustic damping members 116 are planar with the first wall 132 as well as the first and second portions 138A, 1386 of the third wall 136. However, the acoustic damping members 116 do not extend between the studs 104 at the third portion 138C of the third wall 136. In other words, as shown in FIG. 4, there is a gap or space 144 between the third portion 138C of the third walls 136 of the studs 104 that is not occupied by the acoustic damping member 116, in some embodiments. As such, the acoustic damping members 116 fill only the space corresponding to the first and second portions 138A, 1386 of the third walls 136 of the studs 104. The gap 144 provides for further isolation between the studs 104 that helps attenuate acoustic waves. Further, the acoustic damping members 116 described herein can be smaller in size and use less materials, which reduces cost, relative to known structural support systems with acoustic damping properties. In some embodiments, the studs 104 further include flanges 146 coupled to the first wall 134 and the third portion 138C of the third wall 136 and extending into the channel 140 of each stud 104.

The tracks 102 and studs 104 described herein can be metal studs, such as sheet metal studs made of steel, aluminum, or can be made from any other acceptable material, including but not limited to any material now listed or included in the future in the American Society for Testing Materials. Further, the tracks 102 and studs 104 can have dimensions, sizes, and thicknesses (or gauges) that are any acceptable value within the industry, in some embodiments. There are a number of types of material which would be acceptable for the acoustic damping members 116. In some non-limiting examples, the members 116 may be formed of various types of rigid materials, rubber, plastic, PVC, foam, sponges, gels, or the like. One material which has been found to be acceptable is a type of material known as IV3, which is a foam cell polymer material. In the industry, it is sometimes sold under the name Ensolite IV3 and is available from many different manufacturers. This is a closed-cell stiff foam material that is made of a polymer. It can, in some instances, include neoprene, PVC, or a type of sponge rubber.

FIGS. 5A-5G are views of various embodiments of a stud assembly according to the present disclosure. Beginning with FIG. 5A, a stud assembly 200A includes a first stud 202A and a second stud 204A. The stud assembly 200A and studs 202A, 204A are similar to the studs 104 described with reference to FIG. 4. For example, the studs 202A, 204A include a first wall 206A coupled to a second wall 208A, which is coupled to a third wall 210A to define a channel 212A, with the third wall 210A having portions 214A, 216A, 218A coupled to each other in a step-down configuration, similar to stud 104. However, the studs 202A, 204A include the second portion 214A of the third wall 210A extending toward the first wall 206A, such that the studs 202A, 204A have a length between the first wall 206A and the third portion 218A of the third wall 210A that is less than a length between the first wall 206A and the first portion 214A of the third wall 210A, which is an opposite arrangement to the stud 104. This arrangement is similar to that described with reference to the tracks 102 in FIG. 2 and allows the studs 202A, 204A to receive acoustic damping members 220A, but with a different stud configuration.

Figure 5A:
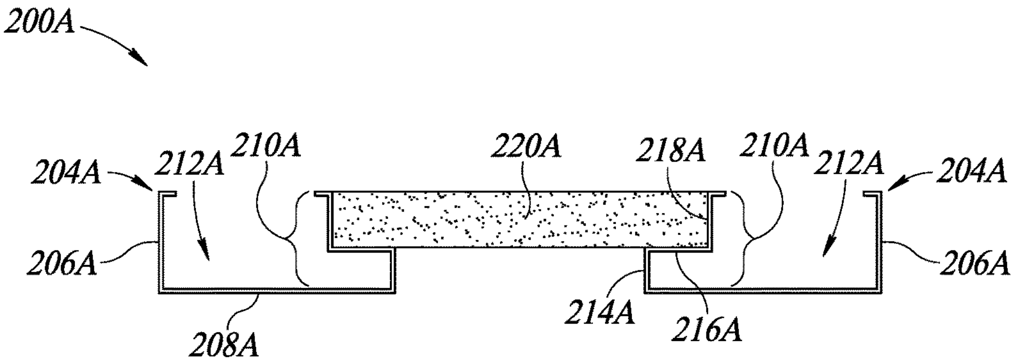
FIGS. 5A-5G are views of various embodiments of a stud assembly according to the present disclosure.
Figure 5B:
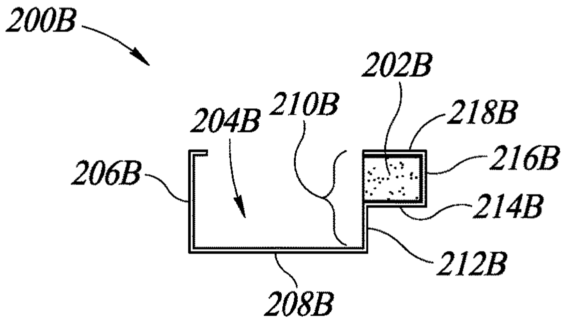

FIG. 5B illustrates a stud 200B that is similar to the stud 104. However, the stud 200B includes an acoustic damping member 202B that is received in a channel 204B of the stud 200B. More specifically, the channel 204B is defined by first, second, and third walls 206B, 208B, 210B. The third wall 210B includes first, second, and third portions 212B, 214B, 216B. The acoustic damping member 202B is received only in the portion of the channel defined by the second portion 214B and the third portion 216B of the third wall 210B. The acoustic damping member 202B is held in place by a flange 218B coupled to the third portion 216B of the third wall 210B. As shown, the flange 218B may extend to be planar with, or beyond, the first portion 212B of the third wall 210B, in some embodiments. In one or more embodiments, the flange 218B is similar in size and arrangement to flanges 146 described with reference to stud 104 in FIG. 4.

Figure 5C:
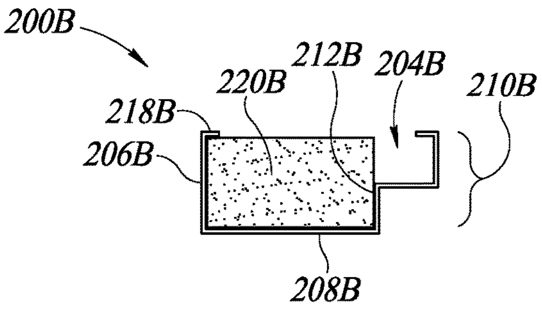

FIG. 5C illustrates the stud 200B, but with an acoustic damping member 220B received in a portion of the channel 204B defined by the first wall 206B, the second wall 208B, and the first portion 212B of the third wall 210B. In FIG. 5C, the flange 218B is a similar size and shape to the flange 146 described with reference to stud 104 in FIG. 4. Further, in some embodiments, the acoustic damping member 220B may occupy the entirety of the channel 204B.

Figure 5D:
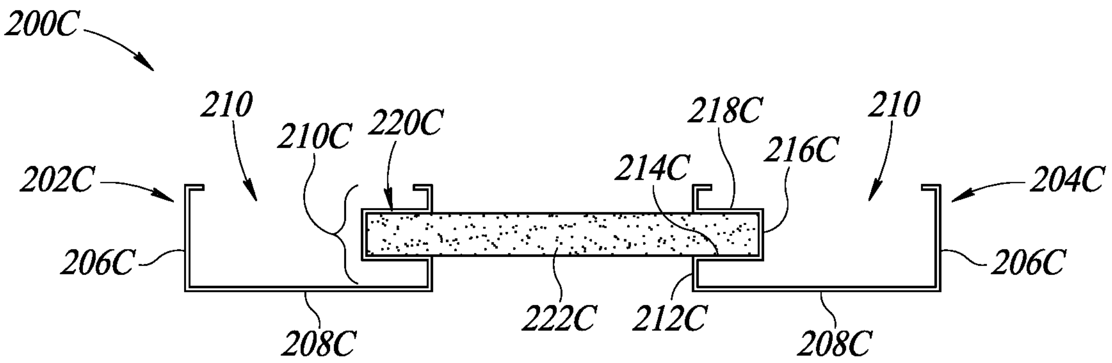

FIG. 5D illustrates a stud assembly 200C with a first and second stud 202C, 204C with a different shape than the other studs described herein. The studs 202C, 204C include a first wall 206C, a second wall 208C, and a third wall 210C coupled to each other to define a first channel 210C. The third wall 210C, however, includes a first portion 212C, a second portion 214C, a third portion 216C, and a fourth portion 218C that define a second channel 220C. The first portion 212C is perpendicular to the second wall 208C and the second portion 214C is perpendicular to the first portion 212C and extends toward the first wall 206C. The third portion 216C is perpendicular to the second portion 214C and extends vertically, but offset from the first portion 212C by the second portion 214C. The fourth portion 218C is perpendicular to the third portion 216C and extends away from the first wall 206C to define the second channel 220C. An acoustic damping member 222C is received in the second channel 220C of each stud 202C, 204C. The design of the studs 202C, 204C further secures the damping member 222C, such that only an adhesive instead of a fastener may be needed to couple the member 222C to the studs 202C, 204C. In some embodiments, no adhesive or fastener is used to couple the damping member 222C to the studs 202C, 204C because of the stud design.

Figure 5E:
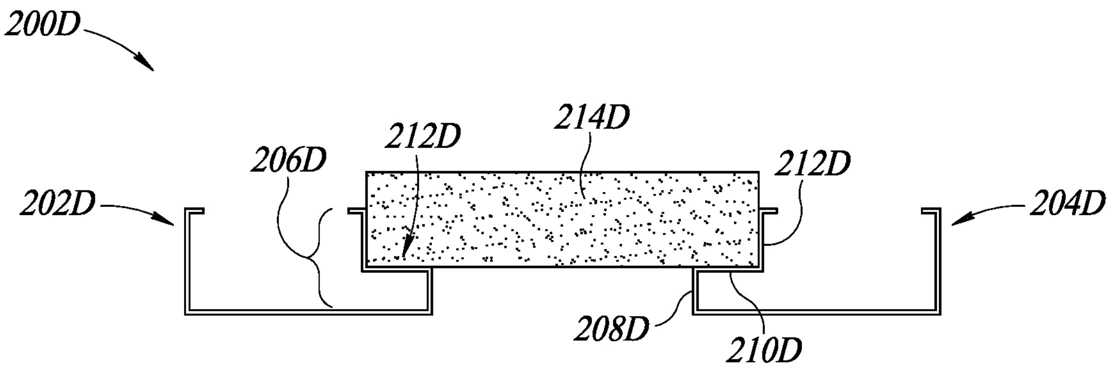
Figure 5F:
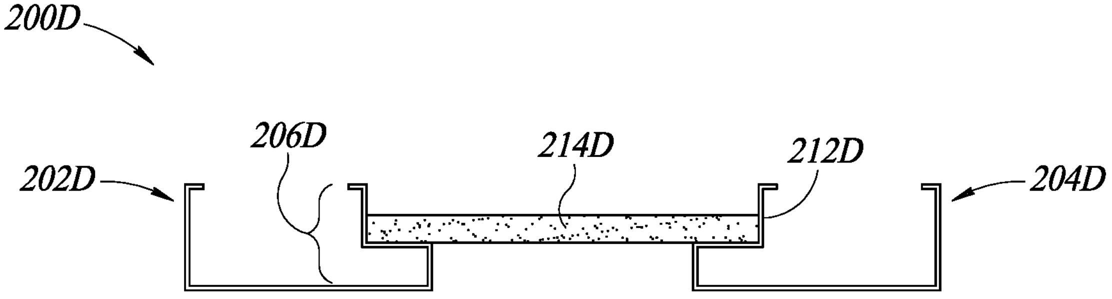

FIG. 5E and FIG. 5F illustrate embodiments of a stud assembly 200D with an acoustic damping member that is not planar with studs 202D, 204D. More specifically, in FIG. 5E, the assembly 200D includes studs 202D, 204D, which may be similar to stud 104 and include a wall 206D with first, second, and third portions 210D that define a ledge 212D. An acoustic damping member 214D is received on the ledge 212D of the studs 202D, 204D, but the acoustic damping member 214D is not planar or flush with the third portion 212D of the wall 206D of the studs 202D, 204D. Rather, the damping member 214D extends beyond the third portion 212D of the wall 206D. The member 214D has larger dimensions and volume than some embodiments described herein in order to increase attenuation of acoustic waves.

In FIG. 5F, the acoustic damping member 214D is similarly not flush with the third portion 212D of the wall 206D, but instead of extending beyond the third portion 212D, the damping member 214D has a thickness that is less than a length of the third portion 212D. In some embodiments, the thickness of the damping member 214D is half of the length of the third portion 212D of the wall 206D, or more or less.

Figure 5G:
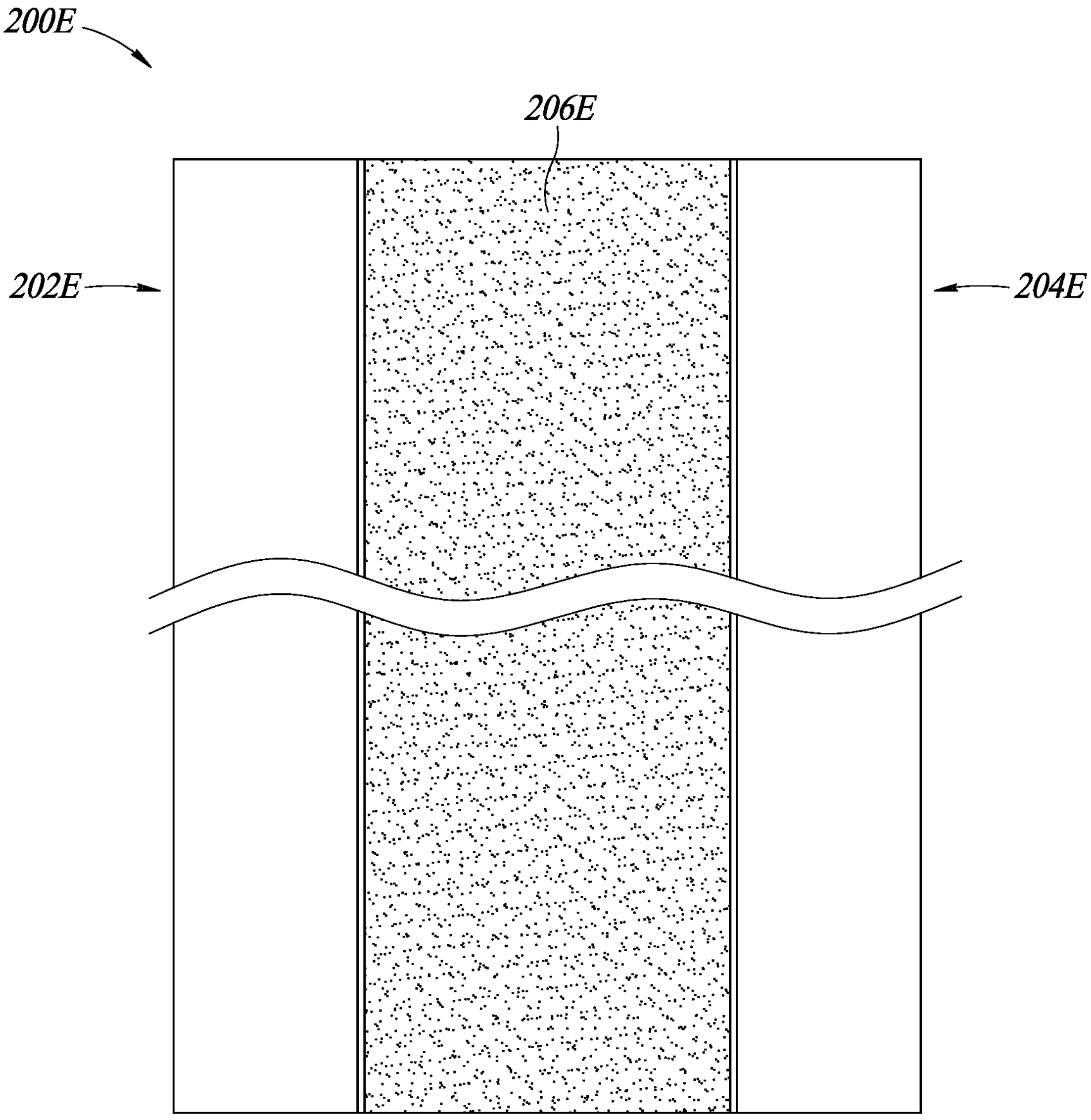

FIG. 5G is an elevation view of a stud assembly 200E with studs 202E, 204E that may be similar to stud 104. However, in the illustrated embodiment, an acoustic damping member 206E extends the entire length of the studs 202E, 204E as a single, continuous piece. In some embodiments, the damping member 206E may be one piece, or may be split in two or more pieces (as in FIG. 3), such as three, four, five, six, seven, eight, nine, ten or more individual pieces. Each of the pieces can spaced along the studs 202E, 204E, or may be coupled to the studs 202E, 204E with at least two of the pieces abutting each other. Further embodiments of the disclosure include the above configurations of the studs also applied to the tracks described herein.

FIGS. 6A-6D are views of various embodiments of a track assembly according to the present disclosure. Beginning with FIG. 6A, a track assembly 300A includes a first track 302A and a second track 304A. The first and second tracks 302A, 304A may be standard studs, in some embodiments, with a channel 306A defined by a web 308A and sidewalls 310A. An acoustic damping member 312A, which may be a rectangular block of material similar to other embodiments herein, is coupled to the tracks 302A, 304A in a space 314A between the sidewalls 310A. In other words, the tracks 302A, 304A are spaced apart by a selected distance in order to provide a double stud wall arrangement, and the damping member 312A is positioned in the space 314A between the tracks 302A, 304A. The size and shape of the damping member 312A can be selected according to various factors, such as desired acoustic wave attenuation, price, and others. The damping member 312A is coupled to the tracks 302A, 304A at the sidewalls 310A. In some embodiments, the damping member 312A is planar and flush with a bottom surface 316A of the webs 308A, but is offset or spaced from the top of the sidewalls 310A, as shown. In one or more embodiments, the damping member 312A fills the entire gap or space 314A between the sidewalls and is planar with, or extends beyond, a top of the sidewalls 310A of the tracks 302A, 304A.

Figure 6A:
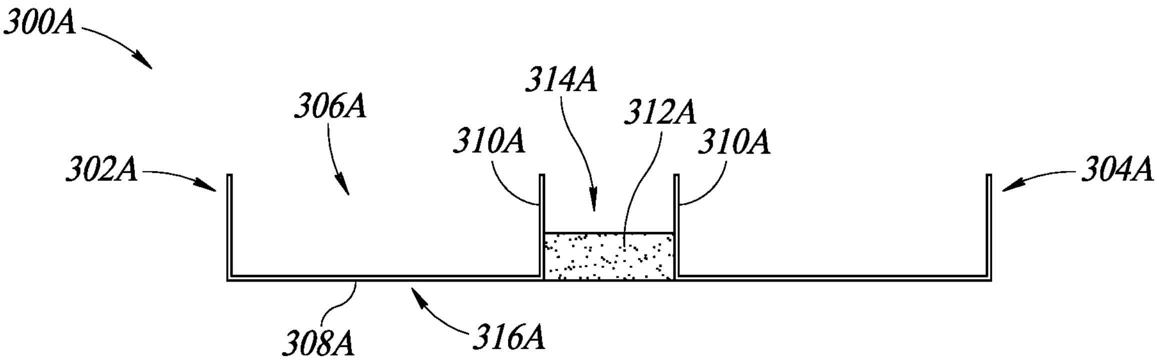
FIGS. 6A-6D are views of various embodiments of a track assembly according to the present disclosure.
Figure 6B:
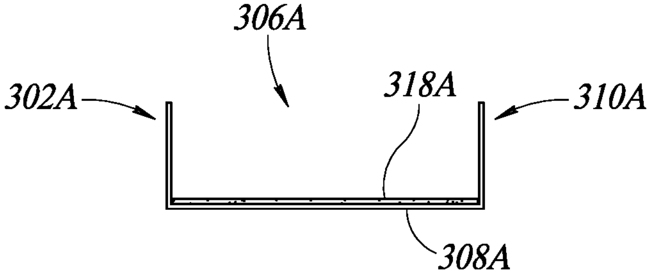

FIG. 6B illustrates one of the tracks 302A from FIG. 6A with a different configuration of the damping member. More specifically, the track 302A has an acoustic damping member 318A in some embodiments that is flat and planar and is received on the web 308A and positioned in the channel 306A of the track 302A. The damping member 318A may have a thickness that is 100 millimeters ("mm"), 90 mm, 80 mm, 70 mm, 60 mm, 50 mm, 40 mm, 30 mm, 20 mm, 10 mm or more or less or any number therebetween, in some embodiments. As such, the damping member 318A is similar to a layer of material on the web 308A of the track 302A that helps to further attenuate acoustic waves. As shown, the damping member 318A is on a top surface of the web 308A, but in some embodiments, the damping member 318A is on a bottom surface of the web 308A. The damping member 318A can also be on any surface of the sidewalls 310A, in some embodiments.

Figure 6C:
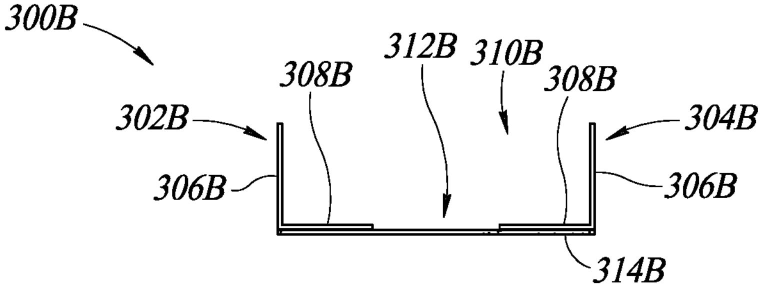

FIG. 6C illustrates a track assembly 300B with a first angle 302B and a second angle 304B. The angles 302B, 304B may be any size, thickness (gauge), length, and material composition that is acceptable in the industry. The angles 302B, 304B are spaced from each and each include first and second sidewalls 306B, 308B that are perpendicular to each other. As such, the angles 302B, 304B define a channel 310B with a space 312B between the second sidewall 308B of each angle 302B, 304B. An acoustic damping member 314B, which may be similar to damping member 318A in FIG. 6B, is positioned on an outer surface of the second sidewall 308B of each angle 302B, 304B. The damping member 314B is coupled to and extends between the angles 302B, 304B and through the gap or space 312B. The damping member 314B may provide additional structural strength to the assembly 300B while also attenuating acoustic waves. The damping member 314B can also be on a surface of the second sidewalls 308B in the channel 310B, as well on any surface of the first sidewalls 306B of the angles 302B, 304B. The assembly 300B can include only the first angle 302B and second angle 304B, which are spaced apart at a selected distance to receive both studs 104, or may include a first angle 302B and second angle 304B pair for each stud 104, such that there are two angles 302B, 304B per stud 104, for a total of four angles 302A, 302B and two studs 104 in the system.

Figure 6D:
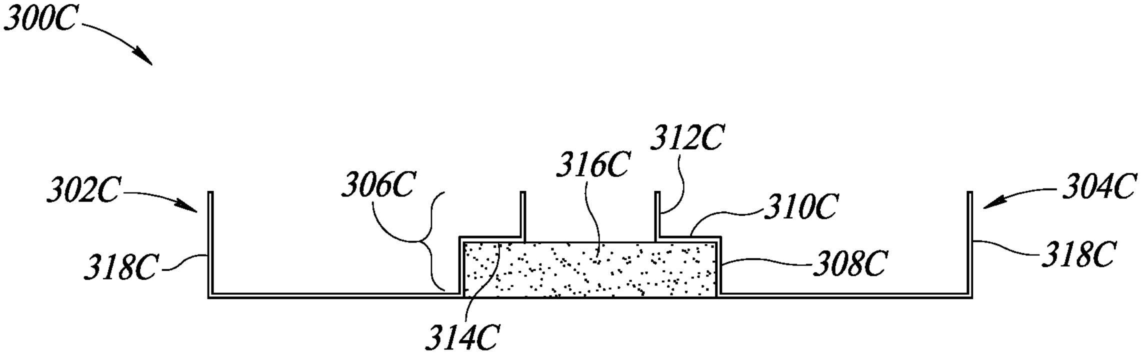

FIG. 6D illustrates a track assembly 300C with a first track 302C and a second track 304C. The first and second tracks 302C, 304C may have a similar arrangement to the studs 104 described in FIG. 4. For example, the tracks 302C, 304C include a wall 306C with first, second, and third portions 308C, 310C, 312C that define a ledge 314C. An acoustic damping member 316C is received on the ledge 314C of each track 302C, 304C. However, in FIG. 6D, as compared to FIG. 2, the second portion 310C of the wall 306C extends away from a sidewall 318C of each track 302C, 304C opposite the wall 306C, instead of toward the sidewall 318C, as in FIG. 2. As such, the principles described above with respect to the stud 104 as well as the studs in FIGS. 5A-5G can be applied equally to the tracks as well, in some embodiments. Further, the principles described above with respect to the tracks in FIGS. 6A-6D, among others, can be applied equally to the studs, in some embodiments.

Figure 7:
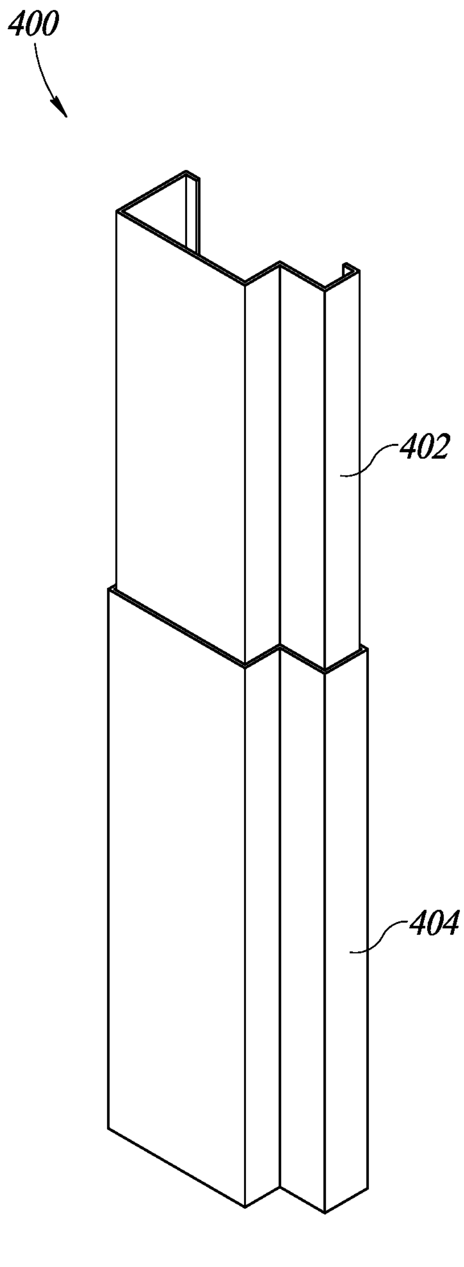
FIG. 7 is an isometric view of an embodiment of a telescoping stud assembly according to the present disclosure.

FIG. 7 is an isometric view of an embodiment of a telescoping stud assembly 400 with an adjustable height or length according to the present disclosure. The stud assembly 400 includes a first stud 402 and a second stud 404 with the second stud 404 nested within, or telescopically received by the first stud 402. Each of the studs 402, 404 may be similar to any of the studs described herein. Although FIG. 7 illustrates only two studs 402, 404, the stud assembly 400 may include more than two telescoping studs, such as three, four, five, or more studs nested within, or telescopically received by each other. In one non-limiting example, the second stud 404 is nested within, or telescopically received by the first stud 402, a third stud is nested within, or telescopically received by the second stud 404, and so on, to form a telescoping stud assembly with more than two studs 402, 404. As such, the second stud 404 can slide relative to the first stud 402, such that the length of the stud assembly 400 is adjustable and can be selected at the installation location to reduce the costs and material waste associated with measuring and cutting the studs on-site at the installation location.

Figure 8:
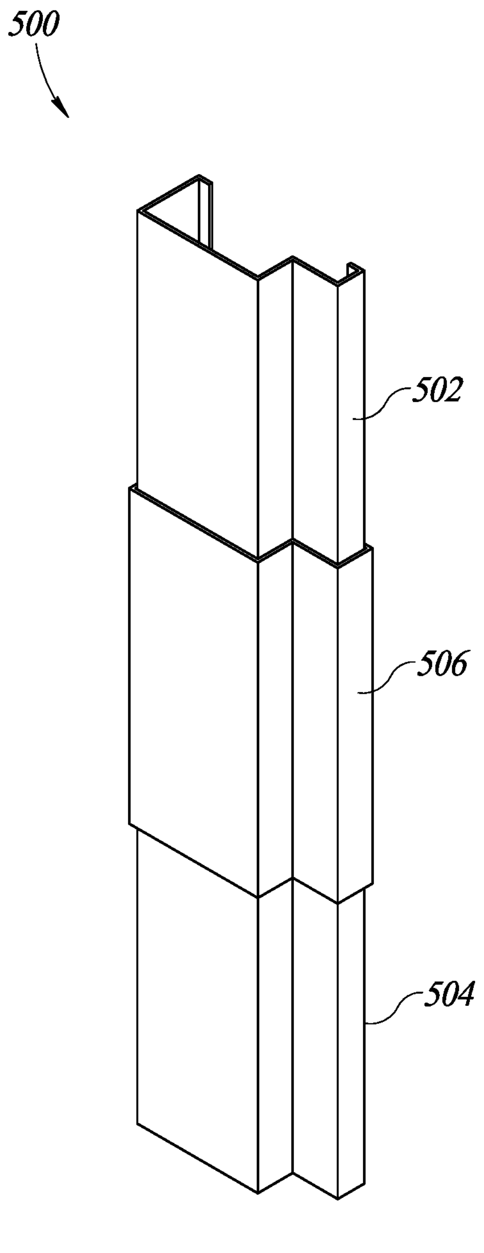
FIG. 8 is an isometric view of an embodiment of a telescoping stud assembly

FIG. 8 is an isometric view of an embodiment of a telescoping stud assembly 500 with first and second extension studs 502, 504 nested within, or telescopically received by a central stud 506. Each of the studs 502, 504, 506 may be similar to any of the studs described herein. The extension studs 502, 504 slide relative to the central stud 506 to vary the length of the stud assembly 500 to a selected size for installation.

Both the assembly 400 and the assembly 500 have an adjustable height to allow for one stud to be used at a construction site for walls of varying heights. For example, a minimum length of the assemblies 400, 500 may be 6 feet in a collapsed configuration and a maximum length may be 10 or 12 feet or more for assembly 400 and 18 feet for assembly 500 in some non-limiting examples. Further, it is known that there are often variations in the actual installation dimensions of wall studs. For example, although plans may call for an 8 foot wall stud, variations in construction may result in the actual height of the stud being 7 feet, 8 inches or 8 feet, 4 inches, in some examples. As such, standard studs are cut down to size on the job site, which increases labor costs for the additional measuring and cutting time and produces waste. By using either of the assemblies 400, 500, the stud can be extended to the selected installation height and installed without cutting, such that assemblies 400, 500 are more efficient. The assemblies 400, 500 can be coupled to other structural supports by any acceptable method, such as with sheet metal screws. Similarly, the studs 402, 404 and 502, 504, 506 can be coupled to each other to increase structural strength by any acceptable method, such as with sheet metal screws or other fasteners. In some embodiments, the studs 402, 404 and 502, 504, 506 may have pre-fabricated holes for receiving fasteners. Alternatively, the studs 402, 404 and 502, 504, 506 may not have pre-fabricated holes and the fasteners may be inserted directly through the studs 402, 404, 502, 504, 506 at a selected location. The assemblies 400, 500 can be used without the acoustic damping members described herein, or the damping members may be attached after the studs 402, 404 and 502, 504, 506 are adjusted to the final installation length.

As such, the embodiments of the present disclosure provide for wall assemblies that attenuate acoustic waves through isolation and with acoustic damping members. The studs can be installed as a single unit, which reduces cost. In some embodiments, the studs have an adjustable length in order to account for variations in installation dimensions or to allow the same stud to be used for different size walls.

In the above description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with structural supports, sound damping, and vibration isolation devices, systems, and methods have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" or other like phrases, such as "in one or more embodiments" or "in some embodiments" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense that is as meaning "and/or" unless the content clearly dictates otherwise.

The relative terms "approximately" and "substantially," when used to describe a value, amount, quantity, or dimension, generally refer to a value, amount, quantity, or dimension that is within plus or minus 5% of the stated value, amount, quantity, or dimension, unless the context clearly dictates otherwise. It is to be further understood that any specific dimensions of components or features provided herein are for illustrative purposes only with reference to the various embodiments described herein, and as such, it is expressly contemplated in the present disclosure to include dimensions that are more or less than the dimensions stated, unless the context clearly dictates otherwise.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A prefabricated assembly, comprising:

a first stud, including:

a first wall;

a second wall coupled to the first wall; and a third wall coupled to the first wall and spaced from the second wall across the first wall, the third wall including a first portion, a second portion, and a third portion, the first portion extending from the first wall perpendicular to the first wall, the second portion extending from the first portion perpendicular to the first portion, and the third portion extending from the second portion parallel to the first portion to define a first insert extending along a length of the third wall;

a second stud, including:

a first wall;

a second wall coupled to the first wall; and a third wall coupled to the first wall and spaced from the second wall across the first wall, the third wall including a first portion, a second portion, and a third portion, the first portion perpendicular to the first wall, the second portion perpendicular to the first portion, and the third portion parallel to the first portion to define a second insert extending along a length of the third wall; and a first acoustic damping member received in the first insert and the second insert and affixed to the first insert and the second insert to form a first connection member in the prefabricated assembly including the first stud and the second stud affixed to each other with the acoustic damping member in a single, integral, unitary, prefabricated stud assembly, the first acoustic damping member being a foam cell polymer material, wherein an outermost surface of the first acoustic damping member is planar with an outermost edge of the first portion of the third wall of the first stud and an outermost edge of the first portion of the third wall of the second stud, and wherein the third portion of the third wall of the first stud is separated from the third portion of the third wall of the second stud by an air gap that acoustically isolates the first stud and the second stud, the air gap cooperating with the first acoustic damping member to attenuate sound and vibration.

2. The prefabricated assembly of claim 1 further comprising:

a plurality of tracks configured to be coupled to a support, each track of the plurality of tracks having a channel, wherein each of the first stud and the second stud include a first end and a second end, the first end of the first stud and the first end of the second stud received in a channel of a corresponding first one of the plurality of tracks and the second end of the first stud and the second end of the second stud received in the channel of a corresponding second one of the plurality of tracks.

3. The prefabricated assembly of claim 2 wherein each of the plurality of tracks further includes:

a first wall;

a second wall coupled to the first wall;

a third wall coupled to the first wall and spaced from the second wall across the first wall, the third wall including a first portion perpendicular to the first wall, a second portion perpendicular to the first portion, and a third portion perpendicular to the second portion to define a third insert extending along a length of the third wall.

4. The prefabricated assembly of claim 3, further comprising:

a second acoustic damping member received in the third insert of a first track of the plurality of tracks and the third insert of a second track of the plurality of tracks and affixed to the third insert of each of the first track and the second track to form a connection member in a single, integral, unitary, prefabricated track assembly including the first track, the second track, and the second acoustic damping member, the prefabricated track assembly configured to be affixed to the stud assembly to form a single, unitary, integral wall assembly.

5. The prefabricated assembly of claim 4 wherein the second acoustic member is offset from the first stud and the second stud.

6. The prefabricated assembly of claim 3 wherein the second portion of the third wall of each of the plurality of tracks extends into the channel, each of the plurality of tracks having a first width between the second wall and the third portion of the third wall that is less than a second width between the second wall and the first portion of the third wall.

7. The prefabricated assembly of claim 1 further comprising:

a second acoustic damping member received in the first insert and the second insert and coupled to the first stud and the second stud to form a second connection member in the prefabricated stud assembly, the second acoustic damping member spaced from the first acoustic damping member along the first stud and the second stud.

8. The prefabricated assembly of claim 7 wherein the second acoustic damping member is planar with the first wall of the first stud and the first wall of the second stud.

9. An assembly, comprising: a first stud, including: a first wall; a second wall coupled to the first wall; a third wall coupled to the first wall and including a first portion, a second portion, and a third portion, the first portion extending from the first wall perpendicular to the first wall, the second portion extending from the first portion perpendicular to the first portion, and the third portion extending from the second portion perpendicular to the second portion to define a ledge extending along a length of the third wall of the first stud; a second stud, including:

a first wall; a second wall coupled to the first wall; and a third wall coupled to the first wall, the third wall including a ledge extending along a length of the third wall of the second stud; and a first acoustic damping member received on the ledge of the first stud and the ledge of the second stud, the first acoustic damping member affixed to the first stud and the second stud to form the assembly including the first stud, the second stud, and the first acoustic damping member as a single, unitary, integral, prefabricated stud assembly, wherein the first stud and the second stud are acoustically isolated by an air space with the first acoustic damping member extending across at least a portion of the air space.

10. The assembly of claim 9 wherein the first stud has a first section and a second section separate from the first section, the second section of the first stud nested within, and telescopically received, by the first section of the first stud, the second section of the first stud structured to move relative to the first section of the first stud to adjust a height of the first stud.

11. An assembly, comprising:

a first stud, including:

a first wall;

a second wall coupled to the first wall;

a third wall coupled to the first wall and including a first portion, a second portion, and a third portion, the first portion transverse to the first wall, the second portion transverse to the first portion, and the third portion transverse to the second portion to define a ledge extending along a length of the third wall of the first stud;

a second stud, including:

a first wall;

a second wall coupled to the first wall; and a third wall coupled to the first wall, the third wall including a ledge extending along a length of the third wall of the second stud;

a first acoustic damping member received on the ledge of the first stud and the ledge of the second stud, the first acoustic damping member affixed to the first stud and the second stud to form the assembly including the first stud, the second stud, and the first acoustic damping member as a single, unitary, integral, prefabricated stud assembly;

a first track including a wall with a ledge and a channel;

a second track including a wall with a ledge and a channel; and a second acoustic damping member received on the ledge of the first track and the ledge of the second track and affixed to the first track and the second track to form a single, unitary, integral prefabricated track assembly, the prefabricated stud assembly configured to be coupled to the prefabricated track assembly with the first stud received in the channel of the first track and affixed to the first track and the second stud received in the channel of the second track and affixed to the second track to form a wall assembly.

12. The assembly of claim 11 wherein the second acoustic damping member is planar with an outer edge of the wall of the first track and an outer edge of the wall of the second track.

13. The assembly of claim 11 wherein the first acoustic damping member is planar with the first stud and the second stud.

14. The assembly of claim 12 wherein the first acoustic damping member has a first outermost surface and a second outermost surface opposite the first outermost surface, the first outermost surface planar with the first wall of the first stud and the first wall of the second stud and the second outermost surface planar with the ledge of the first stud and the ledge of the second stud.

15. The assembly of claim 11 wherein the second acoustic damping member is offset from an outer edge of the wall of the first track and an outer edge of the wall of the second track.

16. The assembly of claim 15 wherein the first stud has a first width between the second wall and the first portion of the third wall of the first stud and a second width between the second wall and the third portion of the third wall of the first stud that is greater than the first width.

17. A device, comprising:

a first stud, including:

a first wall;

a second wall coupled to the first wall; and a third wall coupled to the first wall and spaced from the second wall across the first wall to define a channel, wherein the third wall includes a first portion, a second portion, and a third portion, the first portion perpendicular to the first wall, the second portion perpendicular to the first portion and extending into the channel, and the third portion parallel to the first portion to define an insert extending along a length of the third wall;

an acoustic damping member received on the insert of the first stud in direct contact with the first portion, the second portion, and the third portion of the third wall of the first stud and planar with an outer edge of the third portion of the third wall of the first stud, the acoustic damping member affixed to the first stud to form a single, integral, unitary, prefabricated assembly; and a second stud having an insert, the acoustic damping member received on the insert of the second stud and affixed to the second stud, wherein the prefabricated assembly includes the first stud, the second stud, and the acoustic damping member as a single, unitary, integral prefabricated assembly.

18. The device of claim 17 wherein the channel has a first width between the second wall and the first portion of third wall that is less than a second width between the second wall and the third portion of the third wall.

19. The device of claim 18 further comprising:

a first flange coupled to the second wall and extending into the channel; and a second flange coupled to the third portion of the third wall and extending into the channel.

* * * * *